US008413039B2

(12) United States Patent  
Casey

(10) Patent No.: US 8,413,039 B2  
(45) Date of Patent: Apr. 2, 2013

(54) COMPUTER-IMPLEMENTED SYSTEM AND METHOD FOR CONDUCTING FIELD INSPECTIONS AND GENERATING REPORTS

(75) Inventor: Martin D. Casey, Story, WY (US)

(73) Assignee: IO Services, Inc., Story, WY (US)

( * ) Notice: Subject to any disclaimer, the term of this patent is extended or adjusted under 35 U.S.C. 154(b) by 11 days.

(21) Appl. No.: 13/033,574

(22) Filed: Feb. 23, 2011

(65) Prior Publication Data

US 2012/0216106 A1 Aug. 23, 2012

(51) Int. Cl.
*G06F 3/00* (2006.01)
*G08G 1/123* (2006.01)

(52) U.S. Cl. ........ 715/203; 715/211; 715/221; 715/233; 715/764; 340/3.2; 340/426.19; 340/937; 340/995.1

(58) Field of Classification Search .................. 715/200, 715/201, 202, 205, 209, 210, 211, 229, 230, 715/232, 234, 255, 256, 273, 760, 790, 791, 715/808, 809, 203, 221, 225, 226, 233, 700, 715/764; 340/3.2, 426.19, 539.13, 539.2, 340/908, 937, 938, 941, 942, 951, 952, 953, 340/988, 989, 990, 993, 995.1

See application file for complete search history.

(56) References Cited

U.S. PATENT DOCUMENTS

| | | | |
|---|---|---|---|
| 5,488,558 A | 1/1996 | Ohki | |
| 6,083,353 A | 7/2000 | Alexander, Jr. | |
| 6,711,535 B2 | 3/2004 | Ford et al. | |
| 6,961,586 B2 | 11/2005 | Barbosa et al. | |
| 7,295,517 B2 | 11/2007 | Anim-Appiah et al. | |
| 7,313,759 B2 | 12/2007 | Sinisi | |
| 7,362,229 B2 | 4/2008 | Brinton et al. | |
| 7,428,419 B2 | 9/2008 | Wetzel et al. | |
| 7,515,102 B2 | 4/2009 | Monnerat | |
| 7,557,696 B2 | 7/2009 | Brinton et al. | |
| 7,593,751 B2 | 9/2009 | Barbosa et al. | |
| 7,664,530 B2 | 2/2010 | Skelton | |
| 7,869,944 B2 * | 1/2011 | Deaton et al. ................. 701/491 |
| 2003/0069716 A1 | 4/2003 | Martinez | |
| 2004/0019511 A1 | 1/2004 | McKinney | |
| 2004/0128613 A1 | 7/2004 | Sinisi | |
| 2005/0023347 A1 | 2/2005 | Wetzel et al. | |
| 2005/0040224 A1 | 2/2005 | Brinton et al. | |
| 2005/0182650 A1 * | 8/2005 | Maddox et al. ................... 705/1 |
| 2005/0211777 A1 | 9/2005 | Wetzel et al. | |
| 2006/0015475 A1 | 1/2006 | Birkner et al. | |
| 2006/0081697 A1 | 4/2006 | Brinton et al. | |
| 2006/0235611 A1 | 10/2006 | Deaton et al. | |
| 2006/0235741 A1 | 10/2006 | Deaton et al. | |
| 2007/0074035 A1 | 3/2007 | Scanlon et al. | |
| 2007/0095887 A1 | 5/2007 | Barbosa et al. | |

(Continued)

*Primary Examiner* — Maikhanh Nguyen

(74) *Attorney, Agent, or Firm* — Antoinette M. Tease

(57) ABSTRACT

A system for conducting inspections and generating reports comprising: a device equipped with a global positioning system, a camera and broadband wireless Internet access and on which is installed a client application that comprises an inspection form; a Web services layer; a server; and a browser for accessing a Web application. A field worker enters data into the inspection form, the client application creates one or more records based on the data entered by the field worker, and the Web services layer transmits the record(s) to the server in real time if Internet access is available. The Web application enables a user to view records in real time and create reports based on the records transmitted to the server. A method for conducting inspections and generating reports utilizing the system described above.

38 Claims, 9 Drawing Sheets

U.S. PATENT DOCUMENTS

2007/0226258 A1* 9/2007 Lambdin et al. .......... 707/104.1
2007/0288159 A1 12/2007 Skelton
2008/0120122 A1 5/2008 Olenski et al.
2009/0082039 A1* 3/2009 Wetzel et al. .............. 455/456.6
2009/0157521 A1 6/2009 Moren et al.
2009/0312052 A1 12/2009 Barbosa et al.

* cited by examiner

Figure 7

Any web browser

Site Inspections

Project Information

Project: Project Name  Project #: 123456
Client: Compliance Company  Inspector: John Doe
Client Contact: John Smith  ID#: USA123

How do you want your reports created?

| Reports | Site Locations | Tracking | | 30 Table of Reports ▼ | 29 Create Reports |

|< < 1 2 3 4 5 6 7 > >|  Page size: 18 ↓  447 items in 23 pages

| Submitted | Site Location | Condition | Comments | Inspector |
|---|---|---|---|---|
| 12/5/2010 □ 1/27/2011 □ | | All ▼ | | All ▼ |
| > □ Jan 27, 2011 11:29 AM | Pond | Good | No scum reported | Travis |
| > □ Jan 27, 2011 11:20 AM | Pond | Repaired | Drains good now | Travis |
| > □ Jan 27, 2011 11:18 AM | Pond | Good | No scum reported | Travis |
| ↓ □ Jan 27, 2011 11:15 AM | Pond | Good | No scum reported | Travis |

Image and Map Link

28  Click to see the report location on Web-based Map

26  Report Image

27 This is a caption for the image associated with the record

| > □ Jan 27, 2011 10:49 AM | Pond | Good | No scum reported | Travis |
| > □ Dec 20, 2010 02:20 PM | Pipeline | Good | No leaks | Linda |

|< < 1 2 3 4 5 6 7 > >|  Page size: 18 ↓  447 items in 23 pages

Report Prepared By: ABC Corp. — 123 Main St., Your Town, ST ZIP
Software By: IO Services, Inc. — PO Box 530, Sheridan, WY 82801

Figure 8

COMPUTER-IMPLEMENTED SYSTEM AND METHOD FOR CONDUCTING FIELD INSPECTIONS AND GENERATING REPORTS

BACKGROUND OF THE INVENTION

1. Field of the Invention

The present invention relates generally to the field of computer-implemented inventions, and more specifically, to a system and method for conducting field inspections and generating reports.

2. Description of the Related Art

Currently in the field inspection environment, field workers will gather information for reports using a notepad, a handheld GPS, and a handheld camera, if needed. Field workers will go from site to site collecting the information needed for the particular reporting they do (environmental compliance, construction compliance, safety inspections, and any other location-based reporting). Once the data is collected by the field worker, that field worker must travel back to the office, where the data will be manually organized into a report. This report may take the form of a collection of Microsoft Word or Excel documents, for example. Collecting and organizing this information into a predefined format is time-consuming and tedious. Some companies will have the data gathered from field workers passed to an in-house person who will consolidate the collected data into the reporting forms. The present invention effectively eliminates the need for a transcriber in the office.

In addition, reports need to be delivered to interested parties; therefore, the data must be maintained by the reporting company. Typically, this data is maintained in hard copy form in three-ring binders, and in some cases, multiple sections of the three-ring binders must be updated for each individual report. This updating is generally done by an office worker who collects information from field workers and updates the binders. The present invention replaces this method of maintaining information and updating reports in three-ring binders.

Each step of the process—collecting, organizing, maintaining and updating inspection data—is tedious, time-consuming, and error-prone. Furthermore, there is no ability to audit when and where the data was collected, i.e., the actual GPS location and the date and time on which the data was gathered. As such, there is no way to guarantee that the inspection was actually performed on-site (i.e., at a location that was part of the site inspection). Due to the significant opportunities for error and/or outright fraud in the current methods for collecting and processing inspection data, companies are at risk for possible penalties and fines for noncompliance or for not responding to problem areas.

In the typical situation, if a problem occurs in the field, the field worker will take notes and possibly take a photograph of the location and pass that information on to an office worker either later in the day or later in the week. It is then up to the office worker to input the data from the field worker into a report format, recognize that there was a problem, and notify the proper personnel to dispatch a work crew or take any other appropriate action. Each of these steps is prone to human error, which may result in penalties and/or other regulatory action.

What is needed is a system and method for collecting, organizing, maintaining and updating inspection data in the field and for generating an associated report in real-time without the need for office assistance. The invention would preferably utilize a tablet computer for collection in the field of data, photographs, drawings, location and date and time of inspection.

BRIEF SUMMARY OF THE INVENTION

The present invention is a system for conducting inspections and generating reports comprising: a device equipped with a global positioning system, a camera and broadband wireless Internet access and on which is installed a client application that comprises an inspection form; a Web services layer; a server; and a browser for accessing a Web application; wherein a field worker enters data into the inspection form, the client application creates one or more records based on the data entered by the field worker, and the Web services layer transmits the record(s) to the server in real time if Internet access is available; and wherein the Web application enables a user to view records in real time and create reports based on the records transmitted to the server.

In a preferred embodiment, each record has a global positioning system coordinate and is date- and time-stamped. Preferably, notifications based on client rules are sent in real time when the records are transmitted to the server. In one embodiment, the notifications include copies of the report(s).

In a preferred embodiment, the inspection form enables the field worker to take photographs and/or create drawings, and each record comprises a photograph or drawing. Preferably, each record is saved with the global positioning system location of the photograph or drawing associated with that record. The system preferably enables the user to add a caption to and/or annotate a photograph or drawing and to save the caption and/or annotation(s) with the record.

In a preferred embodiment, the inspection form comprises an inspector field, a site description field, and a condition field. Preferably, the inspection form comprises a notification number field. The inspection form preferably comprises a comments box. The inspection form preferably comprises a status bar that displays messages to the user. The inspection form preferably comprises an image collection toolbar that allows the field worker to manage images associated with an inspection. The inspection form preferably comprises an annotation toolbar that allows the field worker to draw on top of photographs and/or create drawings.

In a preferred embodiment, the system further comprises a pop-up image annotator that allows the field worker to draw on top of photographs and/or create drawings. Preferably, the Web application comprises a content area and a filter bar that allows the user to determine which records are displayed in the content area.

In a preferred embodiment, the Web application comprises a reports page, a site locations page, and a tracking page. The reports page preferably allows a user to select records for inclusion in a report. The site locations page preferably allows a user to view on a map a visual representation of where the records were created. The tracking page preferably allows a user to track the location of one or more devices.

The present invention is a method for conducting inspections and generating reports comprising: providing a server and a device equipped with a global positioning system, a camera and broadband wireless Internet access and on which is installed a client application that comprises an inspection form, wherein a field worker enters data into the inspection form, and the client application creates one or more records based on the data entered by the field worker; and utilizing a Web services layer to transmit the record(s) to the server in real time if Internet access is available, wherein the Web application enables a user to view records in real time and create reports based on the records transmitted to the server.

In a preferred embodiment, each record has a global positioning system coordinate and is date- and time-stamped. Preferably, notifications based on client rules are sent in real time when the records are transmitted to the server. In one embodiment, the notifications include copies of the report(s).

In a preferred embodiment, the inspection form enables the field worker to take photographs and/or create drawings, and each record comprises a photograph or drawing. Preferably, each record is saved with the global positioning system location of the photograph or drawing associated with that record. The inspection form preferably enables the user to add a caption to and/or annotate a photograph or drawing and to save the caption and/or annotation(s) with the record.

In a preferred embodiment, the inspection form preferably comprises an inspector field, a site description field, and a condition field. Preferably, the inspection form comprises a notification number field. The inspection form preferably comprises a comments box. The inspection form preferably comprises a status bar that displays messages to the user. The inspection form preferably comprises an image collection toolbar that allows the field worker to manage images associated with an inspection.

In a preferred embodiment, the inspection form comprises an annotation toolbar that allows the field worker to draw on top of photographs and/or create drawings. Preferably, the inspection form comprises a pop-up image annotator that allows the field worker to draw on top of photographs and/or create drawings. The Web application preferably comprises a content area and a filter bar that allows the user to determine which records are displayed in the content area.

In a preferred embodiment, the Web application comprises a reports page, a site locations page, and a tracking page. The reports page preferably allows a user to select records for inclusion in a report. The site locations page preferably allows a user to view on a map a visual representation of where the records were created. The tracking page preferably allows a user to track the location of one or more devices.

BRIEF DESCRIPTION OF THE DRAWINGS

FIG. 7 is a screenshot of the reports page of the Web application of the present invention.

FIG. 8 is a screenshot of the site locations page of the Web application of the present invention.

DETAILED DESCRIPTION OF INVENTION

A. Overview

Figure 1:
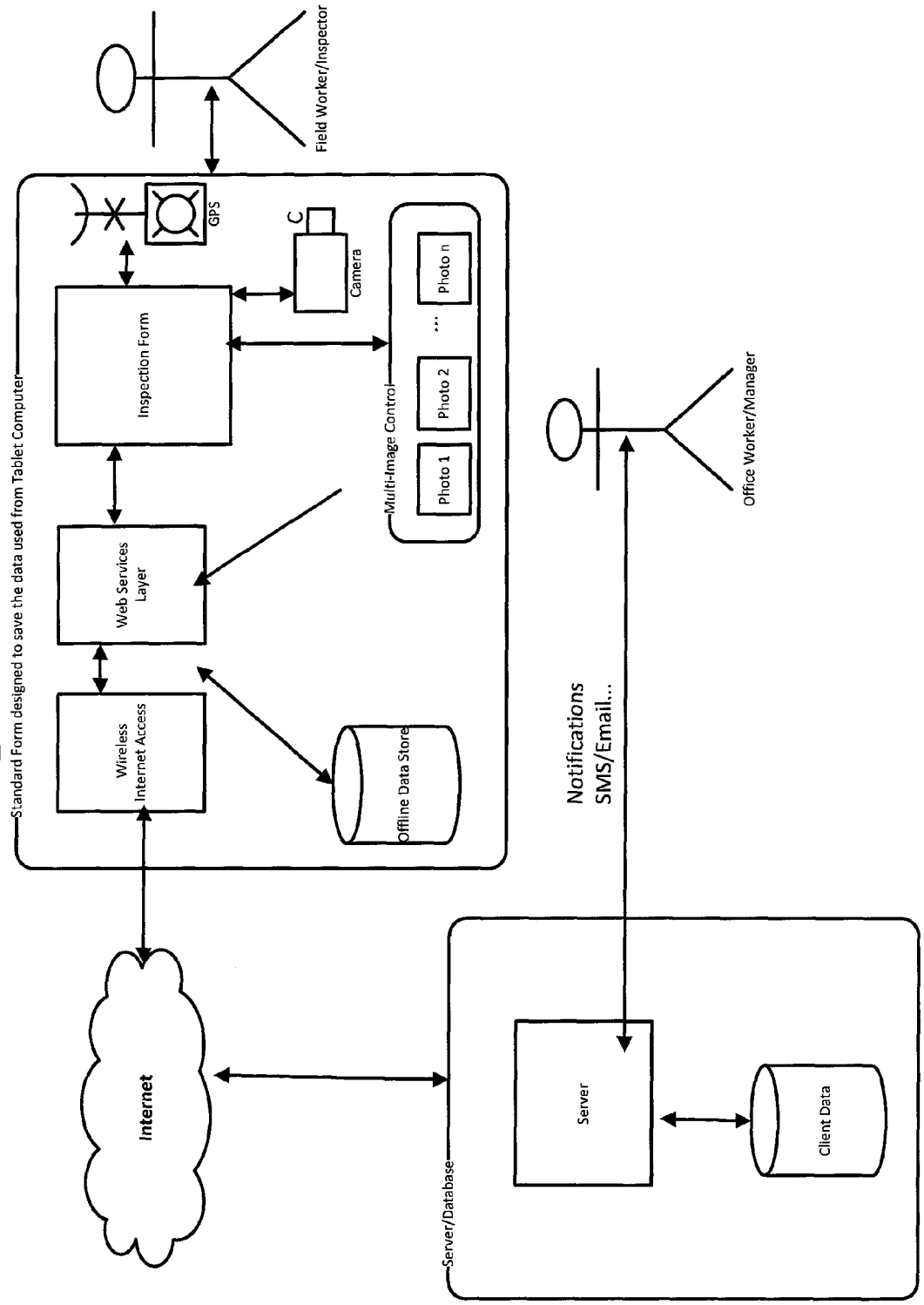
FIG. 1 is a diagram of the system architecture of the present invention.

The present invention is a computer-implemented system and method for collecting data in the field and generating an inspection report, as well as sending notifications (which may include a copy of the inspection report) to the necessary personnel, all in real-time. The invention preferably utilizes a tablet computer that is specifically tailored for field work and comprises a built-in GPS, a built-in camera and built-in broadband wireless Internet access; however, the client application of the present invention is platform-independent and may be installed on any device usable in the field. The client application that is installed on the tablet computer presents the user with a form that is filled out by the field worker while at the site location and customized to client needs and reporting requirements.

Once the form is completed, the software will validate that the information in the form is within informational parameters established by the client. The field worker will then activate a button on the screen of the tablet computer to send the record in real time to an offsite server using a Web services layer. The Web services layer is a software system designed to support interoperable machine-to-machine interaction over a network and is the communication by which the client application on the tablet computer "calls" the server and vice versa.

As explained more fully below, if wireless Internet access is available, then the record is submitted to the server, and any rules-based notifications are sent, in real time. The rules-based notifications may include sending copies of a report to certain individuals. The server processes each record it receives by checking the record against client-based rules to determine whether and which notifications need to be sent and saving the record to the database. The server also notifies the field worker that the record has been saved successfully. If wireless Internet access is not available, then the record is saved locally (i.e., on the tablet computer itself) until such time that wireless Internet access is available and/or the user attempts to send the saved record or a collection of saved records back to the server.

Once the server receives a record, it processes the data in real time, and this data is immediately available through a browser-based (Web) application that is accessible by office workers or managers. Such processing may include sorting/filtering/displaying the records in order of date completed, in order of assigned priority, or according to any other criteria, as specified by the client. The Web application is different than the client application, which is installed on the tablet computer and used to gather data in the field. The Web application is a data viewing application that can be accessed by individuals who are not in the field. The Web application presents information received from one or more field workers via the client application after processing the data.

If notifications are required based on client business rules, then a text or email message will be sent to the appropriate parties, including a notification to the field worker that the record was submitted successfully. The client business rules may be based on any criteria set by the client; by way of example, the client business rules may require that a notification be sent only after a certain number of records have been received reporting the same or similar condition. These notifications allow the office worker or manager in charge of addressing the problem to dispatch work crews or take any other required actions based on the inspection report.

Once the field worker is notified that a record was submitted successfully, this action signifies that the data collected in the field has been saved to the server, the server has completed its processing, the data is available to the Web application, and any other required notifications have been sent. Once the field worker has received a successful notification, he may continue to collect more data and submit additional site inspection records.

The application that is installed on the tablet computer will automatically gather a GPS coordinate and attach it to the inspection record as a field of numeric data (e.g., longitude and latitude coordinates such as shown here: 44.790459, −107,008234). This feature alone will reduce the risk of non-compliance by providing proof to the reporting agency that the inspection records were actually generated at the physical site locations. In a preferred embodiment, each inspection record is also automatically date- and time-stamped (in other words, the record will include information on the exact date and time on which the record was created). The date and time information is automatically saved with a record when the user activates the "send and save site record" button. This feature provides another level of auditability and reduces risk by proving that records were generated and corrective actions taken within a certain time frame.

The present invention alleviates the time-consuming aspect of gathering data and providing inspection reports. Using the client application of the present invention to provide real-time reporting, the field worker can do his entire job out in the field. There is no longer the need for a notepad or handheld GPS and handheld camera. Because of the efficiencies achieved with the present invention, the amount of time required to complete an inspection record has been shown in field tests to be reduced from 15 to 20 minutes per record to an average of five to seven minutes per record.

The server effectively eliminates the need for an office worker to manually import all of the data collected from field workers into three-ring binders, Excel spreadsheets or Microsoft Word documents. The server also effectively eliminates the need for office workers to notify or even look for possible problem areas in these records because the notifications and failure definitions encompassed in the client business rules that are applied by the server. Because of the server, the field worker does not have to come back to the office to deliver his collected data to anyone, thereby saving labor time. The field worker also does not have to organize the data and match the photographs to the GPS locations. All of these tasks are done automatically by the present invention, thereby reducing the potential for human error and improving compliance with safety rules and internal standards.

The present invention provides a streamlined process for gathering field data in the form of records, delivering those records to a server, generating an inspection report, and providing the necessary notifications (which may or may not include actual copies of the report) to interested parties. The present invention is described more fully below in connection with FIGS. 1-6.

As used herein, the term "record" refers to data entered by a field worker and/or acquired automatically by the client application in connection with an inspection. In the current embodiment of the invention, a record includes default data (unless overridden by data entered by the field worker), data entered into the inspection form by the field worker, data acquired automatically by the client application (e.g., date, time and location information), and a single image (which may be a photograph or drawing, as described more fully below). If the field worker collects more than one image using the multi-image control described below, each image in the collection will be paired with the rest of the form data (default and entered) and submitted as a separate record together with its own automatically acquired date, time and GPS location information. This method of record keeping is needed because each image will have its own unique date/time stamp and location information attached to it. The term "report" refers to one or more records; the content and format of each report is based on client rules. Although the term "inspection form" is used throughout this application, that term is not intended to limit the format or content of the form in any respect.

B. Detailed Description of the Figures

Figure 6:
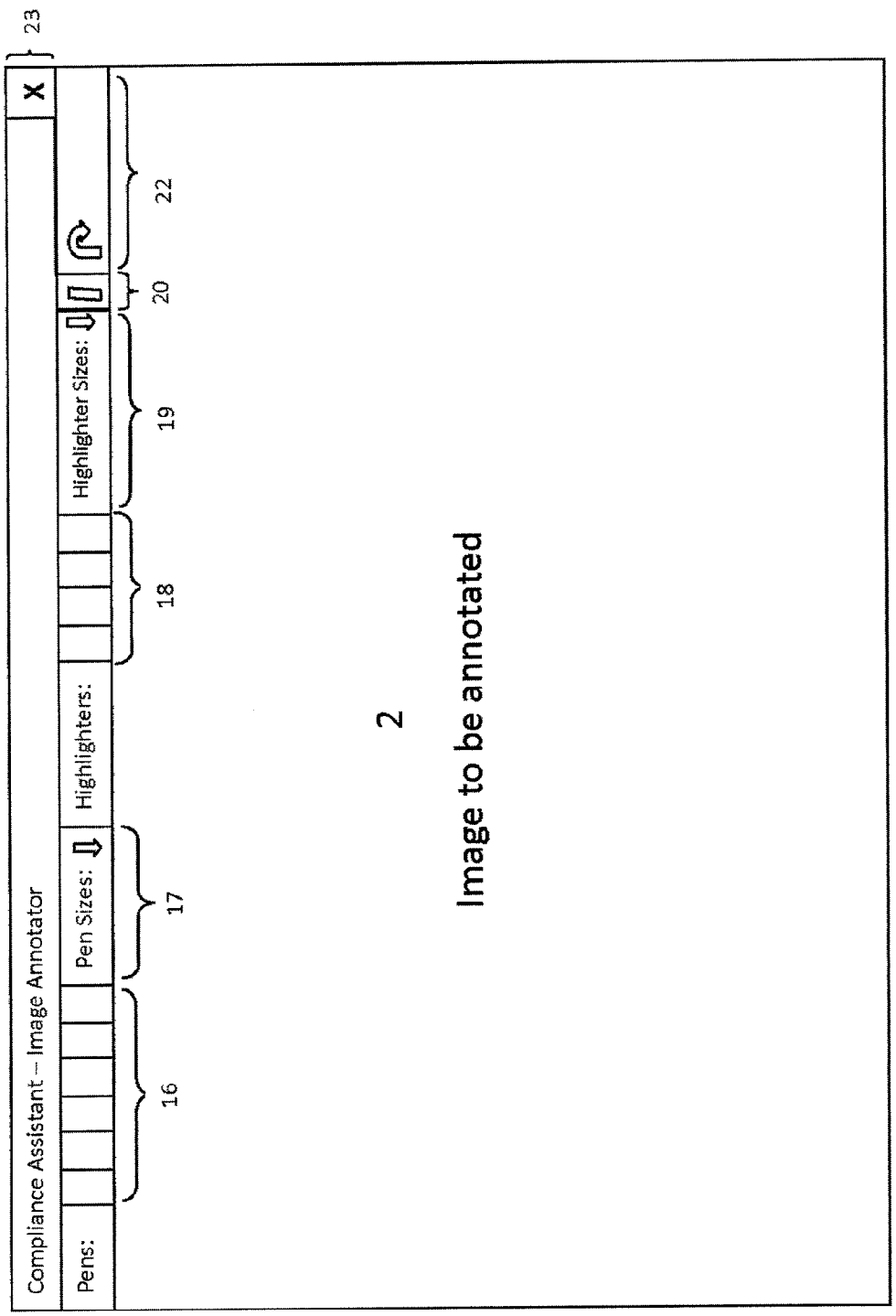
FIG. 6 is a screenshot of the pop-up image annotator of the present invention.

FIG. 1 is a diagram of the system architecture of the present invention. The field worker collects data using a tablet computer on which the client application of the present invention is installed. A tablet computer is typically a compact computer that is portable in nature. The client application is installed on the tablet computer and presents to the user an inspection form that is custom-designed to meet the needs of each client for gathering data in the field. For example, one client may want a four-page inspection form with validation of the data and rules-based notifications based on results of the form input. Another client may prefer a simple six-field inspection form to record basic site data. The form illustrated in FIG. 6 is an example only and is not intended to restrict in any way the form or content of the inspection form used in connection with the client application of the present invention.

Clients may have more than one inspection form per tablet computer. For instance, a building inspector may be responsible for inspecting the framework of a building and for inspecting the electrical wiring. One form would be designed to capture data related to the structural integrity of the framework of the building. A second form could be designed to capture pertinent data related to the installation of the electrical wiring of the structure.

In a preferred embodiment, the tablet computer used in the field contains (i) a Global Positioning System (GPS); (ii) a camera; and (iii) a built-in wireless Internet access device. Using the wireless Internet access, data from the client application (installed on the tablet computer) is transmitted to the server in real-time via the Web services layer. This transmission happens when the user activates a button (for example, a "save and send site record" button), automatically (for records saved in the offline data store) when the client application polls for new data and has an Internet connection, or automatically (for records saved in the offline data store) when the server requests from the client application any records that have not been previously transmitted. The offline data store is preferably a database, but it may also be in the form of XML files, CSV files, or any other method of storing data.

If no Internet access is available at the time, which could happen in very remote areas, then the information collected and entered into each inspection form is saved in an offline data store on the tablet computer for later transmittal to the server. Transmittal of information stored in the offline data store is initiated by the user upon re-initialization of wireless Internet access or automatically in one of the two ways described in the previous paragraph.

Once transmitted from the client application to the server, all of the information entered into an inspection form is preferably stored in a central location on a single server. In one embodiment, each client has a separate database on the server; in another embodiment, all client data is stored in a single database with separate tables for each client. In yet another embodiment, data for each (or any) client may be stored on separate servers at separate locations. The present invention is not limited to any particular manner of storing the data once it is transmitted to a server.

If the tablet computer has Internet access, then all data will be stored on the server in real time upon activation of the "save and send site record" button by the field worker. Once the data is stored on the server, then a rules-based notification system that is custom-designed based on the client's business needs will result in text messages or email notifications (with or without copies of the report) being sent to the office worker/manager or any other interested parties. A simple example of a sent message would be to a Maintenance Manager: "Field worker J. Smith has identified a broken valve at coordinates 44.790459, −107.008234, NW corner of Building A. Please schedule valve replacement as soon as possible."

Referring to FIG. 1, the field worker is a person who collects data and enters it into an inspection form that is part of the client application. Data may consist of readings taken from a gauge, physical condition of a component, an environment defined as a safety issue, etc. The user may take one or more photographs with the built-in camera, create one or more drawings, and then transmit the data by activating a button on the form. The user will receive a notification (in the form of a pop-up, status line, etc.) that the data was transmitted in real time or, if there is no Internet access, that the data has been stored locally in an offline data store. When a record is saved, the GPS location and date and time information are saved for later transmission with the record. In a preferred embodiment, the user is notified (in the form of a pop-up, status line, etc.) of saved records the next time he tries to save a new record. Saved records are sent to the server automatically (as described above) or when the user activates the "send saved records" button.

The built-in GPS is used to collect location-based information when a record is created. The record is saved with the GPS location that is collected from the built-in GPS at the time an image (photograph or drawing) is created. This GPS tagging enables the office worker/manager to confirm the location at which an image was taken (in the case of a photograph) or created (in the case of a drawing). In addition, the GPS information may be useful for tracking the field worker for safety reasons.

In a preferred embodiment, a blank drawing image is provided automatically each time the user starts the program, and the date, time and current GPS location of the tablet computer are associated with this default image. If the user does not take a photograph or create a drawing, then the record is saved with the default (blank) drawing. If the user takes a photograph, then that photograph will replace the default drawing if the drawing has not been modified by the user (i.e., if the user has not already created a drawing). If the user creates a drawing in lieu of a photograph, then that drawing will be saved with the record. If the user creates a drawing in addition to taking a photograph, then the drawing and photograph are saved as two separate records together with the rest of the inspection form data. The field worker may create and save multiple photographs and/or drawings.

The wireless Internet access device may be separate from the tablet computer or built into the tablet computer. Multiple wireless Internet access methods could be built into the tablet computer; for instance, a wireless Internet card that can connect to standard wireless that is available in many offices may be used, as could a cellular broadband card, site-installed radio system, or even a satellite broadband modem. The Web services layer utilizes any of the Internet connections that is available to communicate with the server. If none is available, then the Web services layer will recognize this fact and store the data in an offline data store locally on the tablet computer for transmittal to the server at a later time when Internet access is available.

The server receives data from the Web services layer and stores the data into a database specific to each client. This database may or may not reside on the server. Once the data is stored in the client database, reports are generated and distributed according to client business rules and also made available in the Web application.

A preferred method of storing client data is to store the data from all inspection records in an individual database with a unique table of data for each specific form. In this embodiment, the fields in the database correspond to the fields in the record from the client application with a one-to-one mapping. As noted above, the data is saved in real time as data is received from each field worker. In this embodiment, raw data may be extracted from records and organized into a variety of reports, which may be formatted for differing needs (i.e., engineering data, management decision-tree data, executive summary).

The multi-image control (reference numbers 8, 12, 13, 14 and 15 on FIG. 4) is used for creating, viewing and managing multiple images. All of the information associated with an image is stored with a record in real time as long as there is access to the Internet at the time of record submission. If Internet access is not available at the time of submission, then this information is stored in the offline data store for later transmittal.

Figure 2:
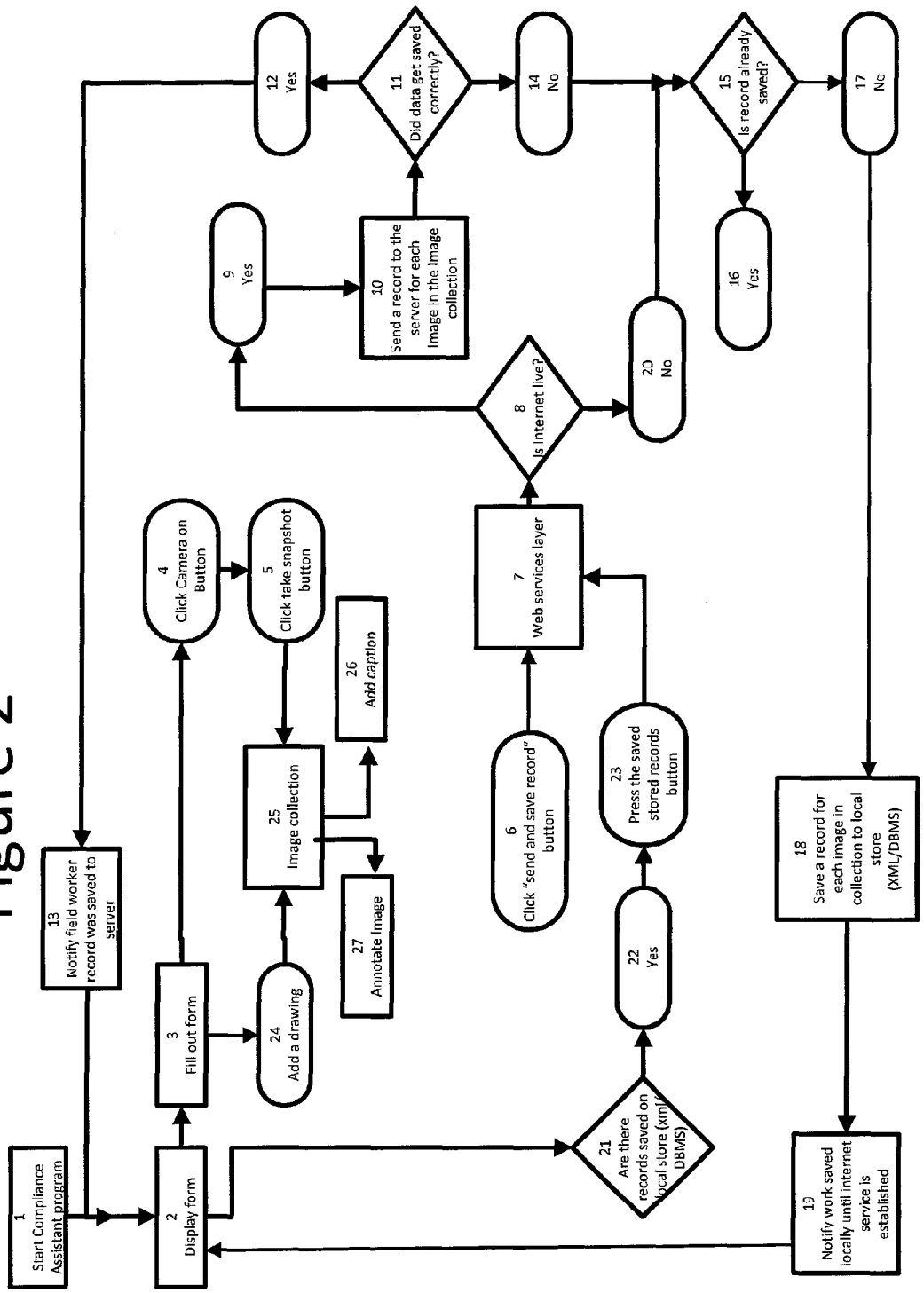
FIG. 2 is a flow diagram of the client application functions of the present invention.

FIG. 2 is a flow diagram of the client application functions of the present invention. First, the user starts the computer program by activating the appropriate button on the tablet computer (step 1). This action will bring up the program and display the customized inspection form (step 2). Once the inspection form is displayed, a field worker will fill out the form with the correct values for the type of report for which he is collecting data (step 3). If the field inspection form requires a photograph, the field worker will activate the "turn the camera on" button (step 4) and take a photograph by activating the "take a snapshot" button (step 5). As noted above, the user may take multiple photographs. Once the user has finished filling out the form, he will save it by activating the "save and send site record" button (step 6).

Once the "save and send site record" button has been activated, the program accesses the Web services layer (step 7) to communicate with the server through wireless Internet if it is available (steps 8 and 9). If Internet connectivity is available, then the Web services layer proceeds to send the data to the server (step 10). If the data is saved (step 11), then the field worker is notified that the record was saved to the server (step 13). In a preferred embodiment, the field worker is notified by displaying a pop-up message that allows the user to click "OK" to acknowledge that the data was saved correctly.

If the data is not saved to the server (step 14), then the program determines whether the record has already been saved locally to the offline data store (step 15). If it has (step 16), then the program displays an empty inspection form ready for user input. If it has not (step 17), then the record is stored to a local hard drive in XML file format for form data and JPEG file format for photographs or stored in a local database management system (DBMS) such as SQL Server express or any other database that is used to store data locally on the tablet computer (step 18). The field worker is then notified (preferably via a pop-up dialog box that allows the user to click "OK" to acknowledge receipt of the message) that the data was saved locally on the tablet computer (step 19), and the status bar is updated to reflect that there is a saved record and to reflect the number of records stored on the device locally. At this point, the program will attempt to resend the data as soon as Internet access is established; alternately, the user may attempt to resend the data by activating the "send saved records" button (step 23).

If Internet access is not available (step 20), then the system proceeds to step 15 to determine whether the record has been saved locally. Each time the program returns to the display new inspection form state (step 2), the program automatically checks for saved records stored locally (i.e., on the tablet computer) that need to be sent to the server (step 21). If there are saved records stored locally (step 22) that have not been sent to the server, then the status bar is updated to notify the user of the number of records that are available to be sent to the server, and the "send saved records" button (step 23) is enabled. When the "send saved records" button is enabled and the user activates it (step 23), the Web services layer (step 7) is accessed, and the program attempts once again to send the saved records to the server.

When the user activates the "add drawing" button (step 24) (see also reference number 15 on FIG. 4), a new default canvas is added to the image collection (step 25) and displayed. Each time the user activates the "take a snapshot" button (step 5) (see also reference number 8 on FIG. 4), a new photograph image is added to the image collection (step 25). The user may then add a caption (step 26) and/or annotate the image (step 27).

Figure 3:
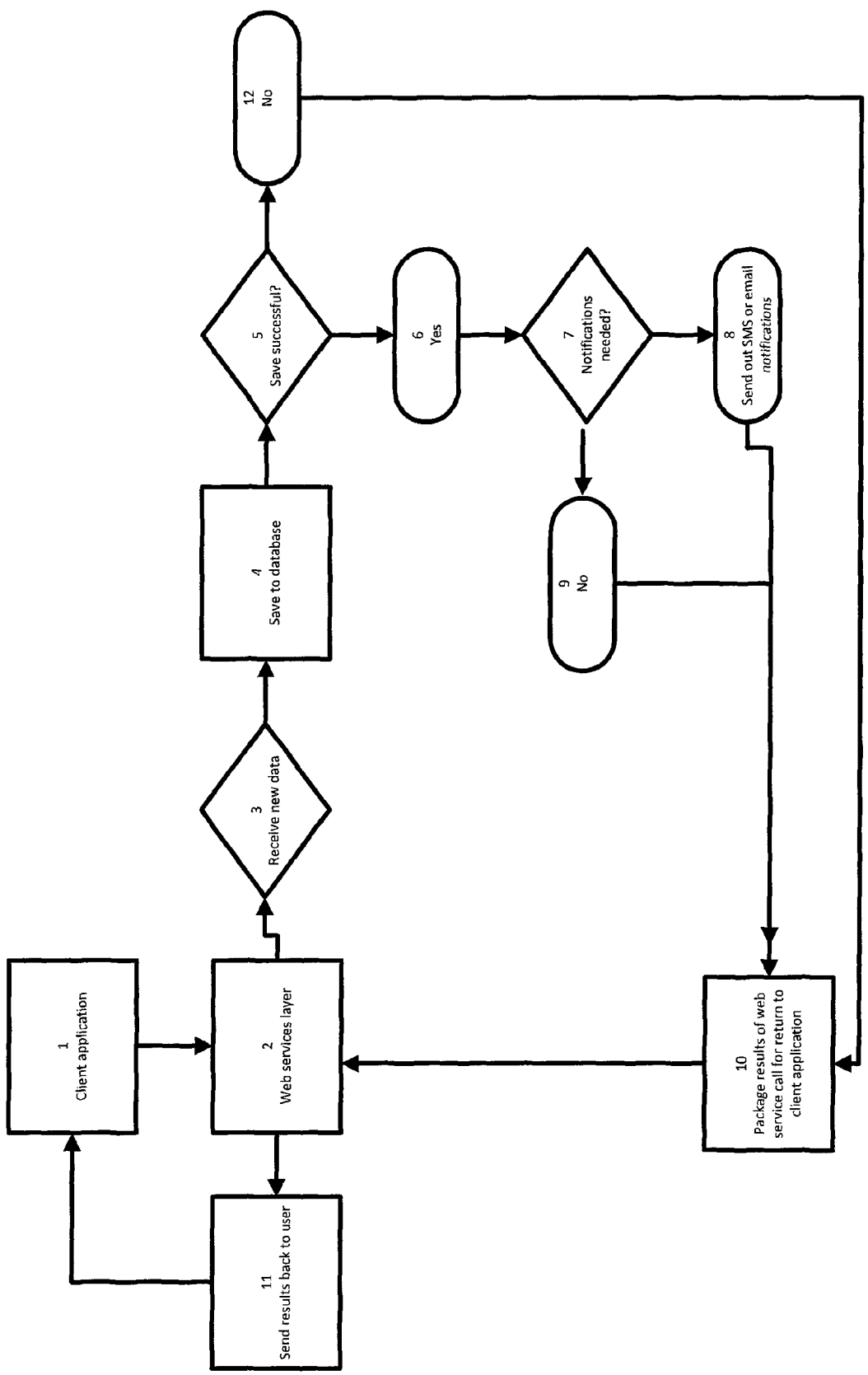
FIG. 3 is a flow diagram of the server functions of the present invention.

FIG. 3 is a flow diagram of the server functions of the present invention. As described above, the client application (step 1) will attempt to send recorded data to the server through the Web services layer (step 2). The Web services layer relays messages to the client application from the server regarding whether the record was successfully saved. The Web services layer may also communicate additional data—for example, two-way live text between field worker and the officer worker or between two field workers—between the client application and server.

Once data is received by the server (step 3), the program attempts to store the data to a database (step 4) and determines whether the save was successful (step 5). If the save to the database was successful (step 6), then the program determines whether any notifications are needed (step 7). If notifications are needed, then the program sends out the requisite SMS or email notifications (step 8) (with or without an actual copy of the report) based on pre-programmed client-specific rules and business logic. If no notifications are needed (step 9), then the program returns the results of the Web services layer call (step 10) to the client application (step 11). In most cases, these "results" are simply a true or false as to whether the save was successful. If the data was not successfully saved to the local database (step 12), then the program packages those results for return to the client application (step 10).

Figure 4:
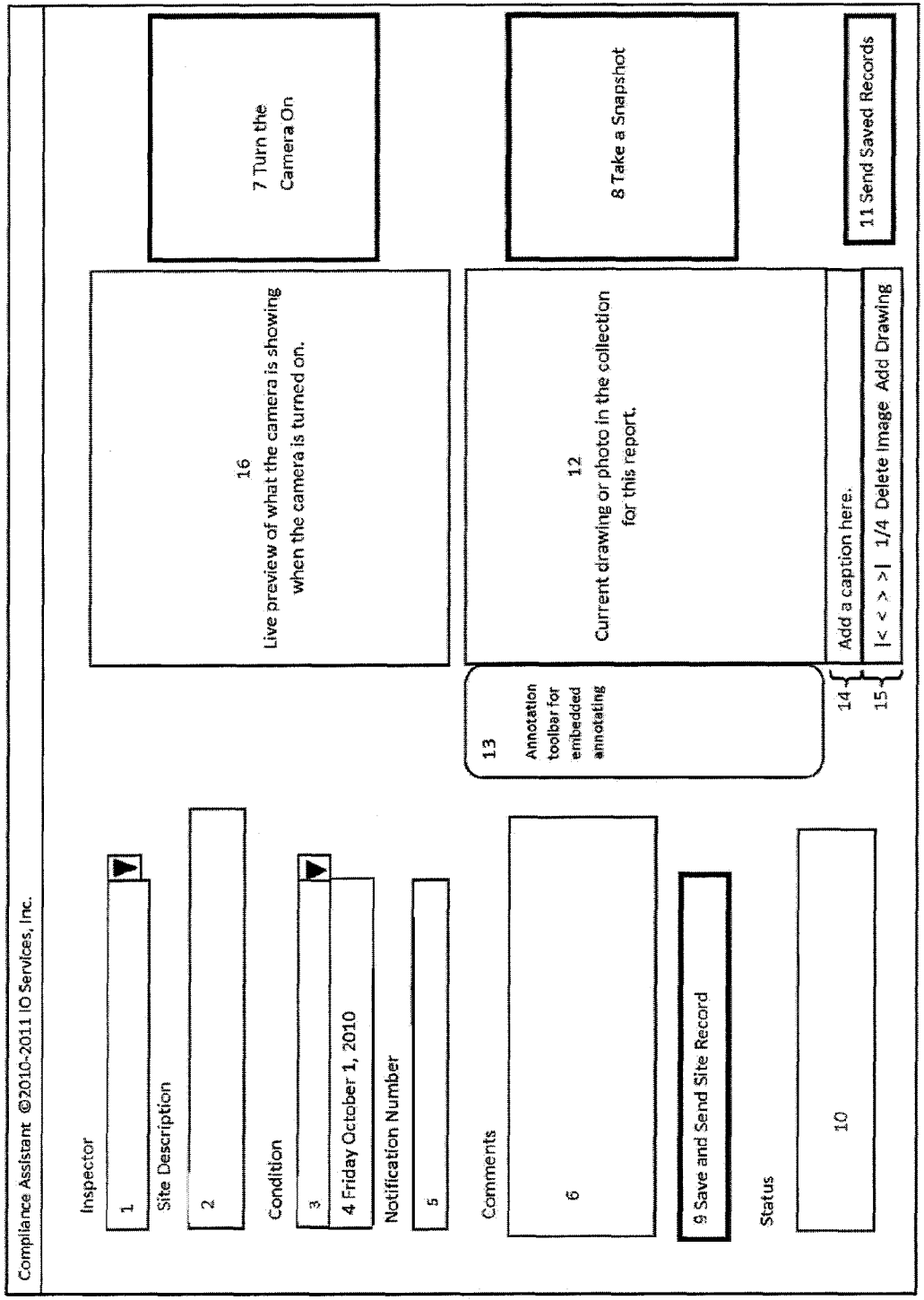
FIG. 4 is a screenshot of the standard form of the present invention.

FIG. 4 is a screenshot of the standard form of the present invention. The inspector field 1 is preferably a drop-down list box for identifying the person in the field who is generating the records. The site description field 2 allows the user to enter a short description of the actual location at which the report is being generated. The condition field 3 is a drop-down list box that lists potential conditions of the site, for example, good, repaired, maintenance required, and urgent attention needed. These conditions are typically selected by the client in advance and pre-programmed into the client application. In the example provided in FIG. 4, the condition field includes a dependent date field 4 for the purpose of recording the repair date, if applicable.

The notification number field 5 allows the user to enter one or more telephone numbers of one or more people to whom the user would like a notification to be sent via SMS text message for each record. The comments box 6 allows the user to enter as many comments as necessary or desirable to adequately describe the state of the site. The "turn the camera on" button 7 causes the camera that is embedded in the tablet computer to be turned on or off for purposes of taking photographs. The "take a snapshot" button 8 adds a photograph to the multi-image control (described more fully below).

The "save and send site record" button 9 saves the current records, which includes all of the information entered in all of the fields described above, together with any images associated with those records. As explained above, a separate record is saved and sent for each image. (Technically, a record is not created until the "save and send site record" button is activated.) If the tablet computer has Internet access when the "save and send site record" button is activated, then the records will be transmitted in real time to the server. If not, then the records are saved in the offline data store for transmittal at a later time when Internet access is available. If Internet access is not available, then a message is displayed to inform the user that the records have been saved locally and can be submitted at a later time.

Messages to the user are displayed in the status bar 10. These messages may include the fact that a record was successfully transmitted to the server, the fact that a record was not successfully transmitted to the server (due to lack of Internet access), and the number of records saved locally that still need to be transmitted to the server. If one or more records is/are saved locally that has/have not been transmitted at any time to the server, then the "send saved records" button 11 is enabled. When activated, this button will attempt to send all of the saved records in the offline data store to the server. If Internet access is not available, then a pop-up message will be presented to the user indicating that there is no Internet access and the records have not been sent.

Referring to FIG. 4, reference numbers 8 (take a snapshot button), 12 (image display), 13 (annotation toolbar), 14 (caption button) and 15 (image collection toolbar) constitute the multi-image control. The image display 12 is the place where the current image is displayed to the user. The annotation toolbar 13 allows the user to mark up and annotate images (photographs and/or drawings) to emphasize or draw focus to certain aspects of the image. The annotation toolbar 13 is described more fully in connection with FIG. 5. The caption button 14 allows the user to add descriptive text to each image. The image collection toolbar 15 allows the user to manage all of the images that are associated with an inspection. Specifically, the image collection toolbar 15 allows the user to delete an image, add a drawing and/or navigate among the images in the image collection. Referring to reference number 15 on FIG. 4, the icons on the toolbar from left to right are as follows: "|<" go to the first image in the collection, "<" go to the previous image, ">" go to the next image, and ">|" go to the last image in the collection. The "delete image" icon, when clicked, deletes the current image being viewed and moves to the previous image in the collection, or if there are no images left, creates a default drawing. The "add drawing" icon, when clicked, adds a new drawing to the image collection.

Figure 5:
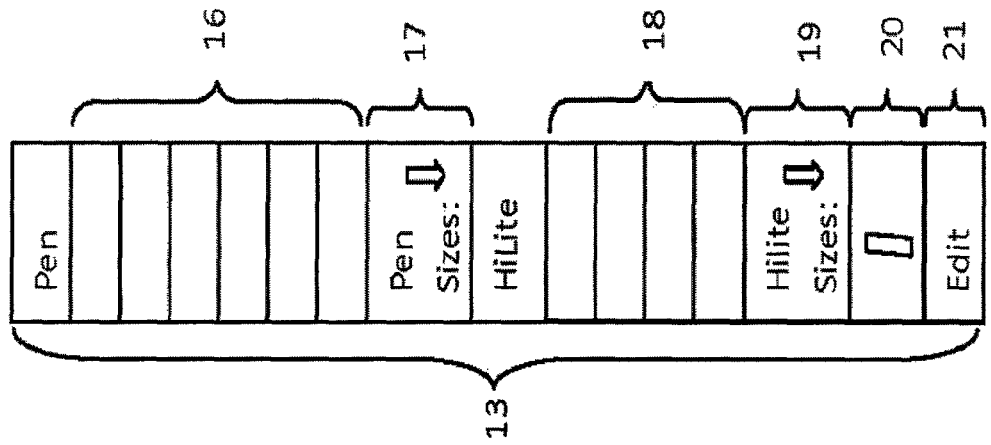
FIG. 5 is an illustration of the annotation toolbar of the present invention.

FIG. 5 is an illustration of the annotation toolbar of the present invention. This toolbar 13 is used to draw on top of photographs or to create freehand drawings. The annotation toolbar preferably allows the user to select pen colors 16 and pen sizes 17, as well as highlighter colors 18 and highlighter sizes 19. Using these pens and highlighters, the user can annotate the photograph or create a freehand drawing. The eraser tool 20 allows the user to erase parts of the drawing or annotations on the photograph. The edit button 21 will display the pop-up image annotator, which provides the user with an enlarged copy of the image for editing.

FIG. 6 is a screenshot of the pop-up image annotator of the present invention. The pen colors 16, pen sizes 17, highlighter colors 18, highlighter sizes 19 and eraser tool 20 are the same as described in connection with FIG. 5. The save icon 22 will automatically save the results, return the user to the standard form shown in FIG. 4, and display the results in the image display 12. The close icon 23 will prompt the user to save any changes if any changes have been made to the original image and then close the pop-up image annotator and return to the standard form shown in FIG. 4. If the user clicked "yes" when prompted to save changes, then the results will be displayed in the image display 12.

Figure 8:
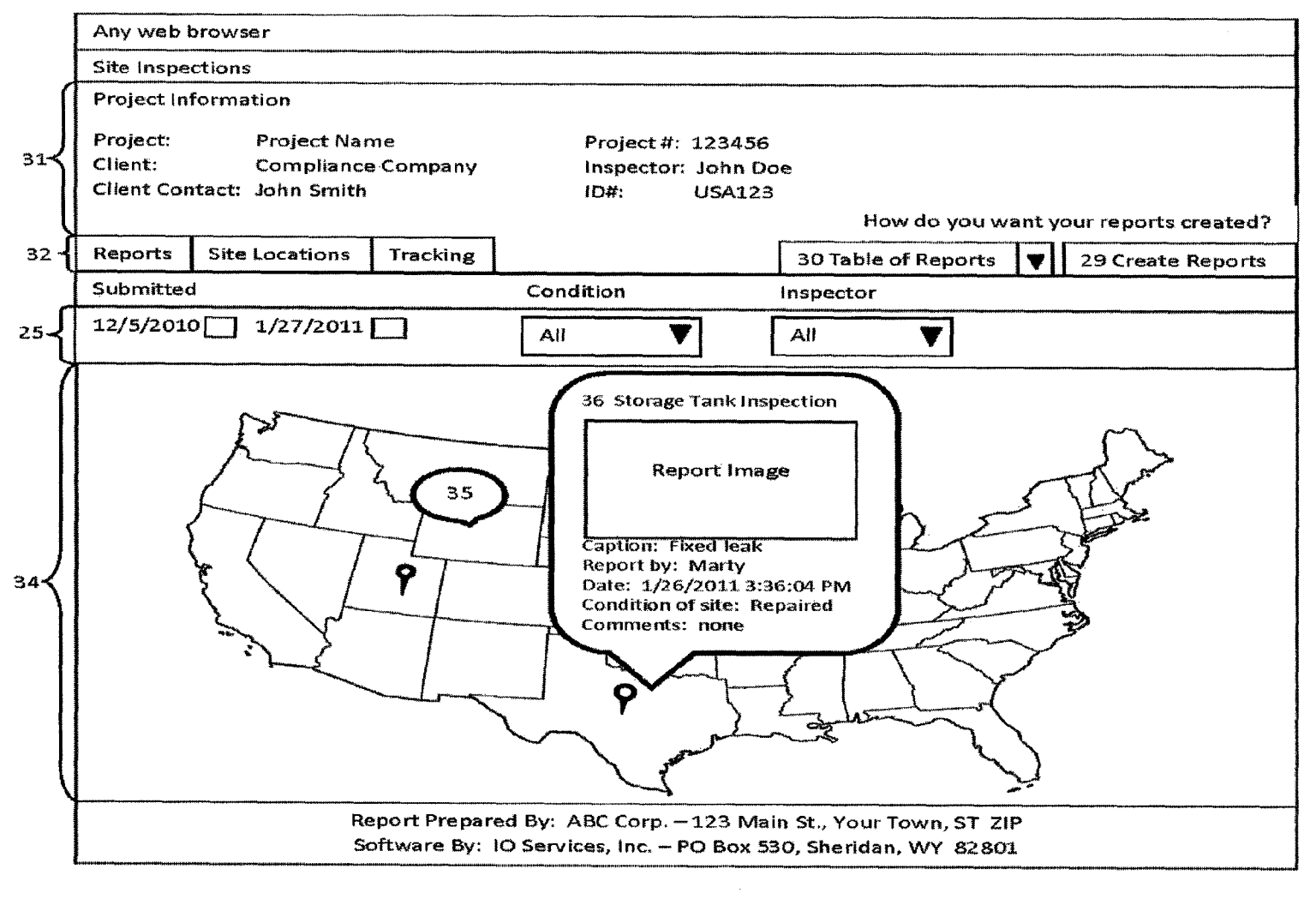
Figure 9:
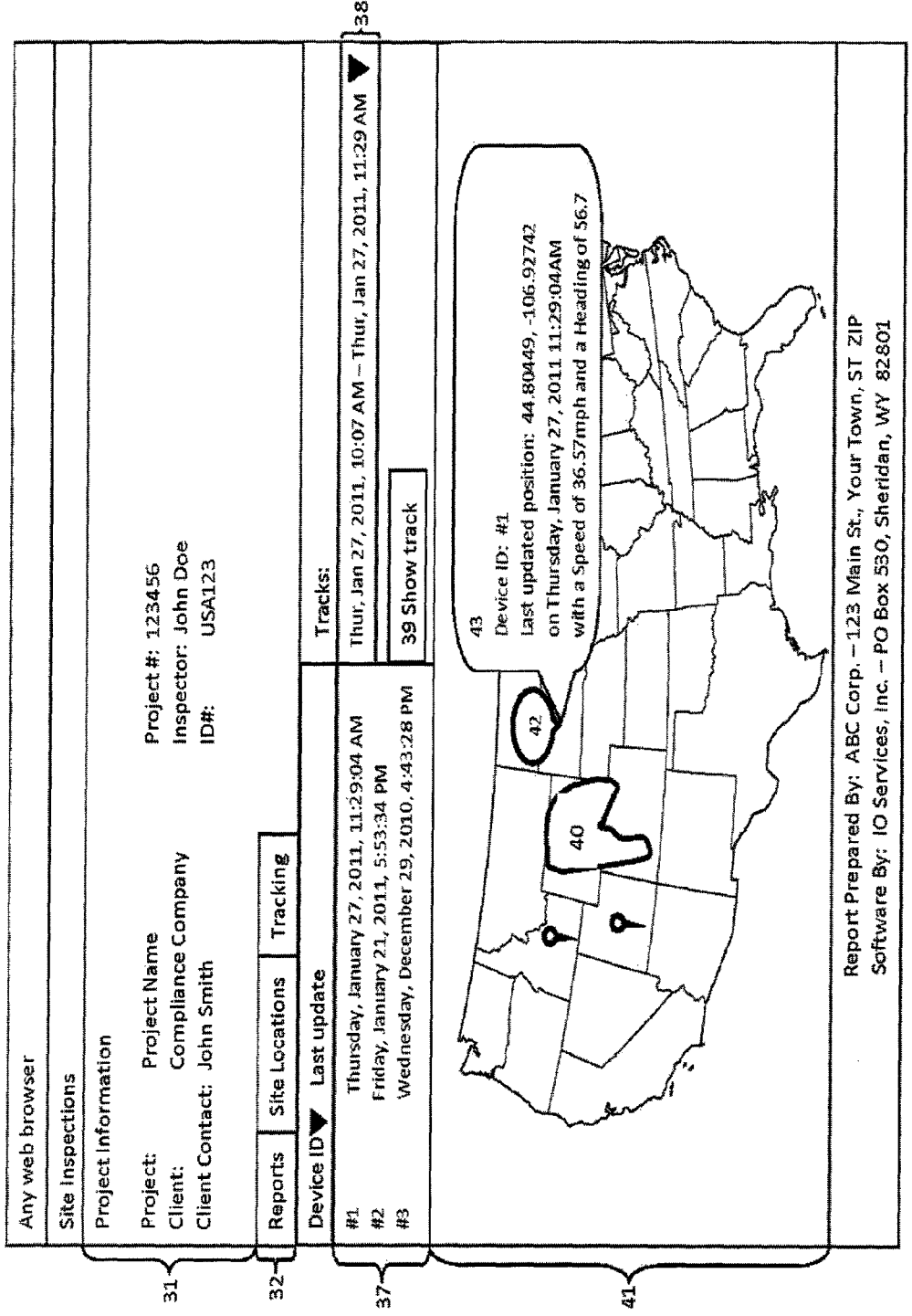
FIG. 9 is a screenshot of the tracking page of the Web application of the present invention.

FIGS. 7-9 relate to the Web application of the present invention. In a preferred embodiment, the Web application comprises a reports page, a site locations page and a tracking page. The Web application is accessible from any Web browser.

FIG. 7 is a screenshot of the reports page of the Web application of the present invention. The reports page is used by Web application users to view any and all records that have been saved for a particular project. The screenshot shown in FIG. 7 provides on example of what a reports page might look like, but the present invention is not limited to any particular configuration or content of the reports page; the configuration and content of the reports page is customized based on client business needs.

In the embodiment shown in FIG. 7, the reports page will show in the content area 24 all current records in reverse date order, with the current records at the top of the list. In the example provided, the user may filter through these records by selecting date ranges, condition, and/or inspectors from the filter bar 25; however, any other criteria for filtering may be used. For example, the user may only want to see all records from the month of January 2011 that failed the inspection. Using the controls shown in the filter bar 25, the user controls which records are displayed in the content area 24. Clicking on the ">" icon will cause the selected record to expand; in the current embodiment, the expanded record includes the image associated with the record 26, any caption associated with that image 27, and a link to a web-based mapping application 28, which displays the location at which the record was created. In the example shown in FIG. 7, the fourth record is expanded.

From the reports page, the user may select certain records for inclusion in a report by checking the box to the left of each listed record and clicking the "create reports" button 29. When this button is activated, a pop-up window appears allowing the user to download and save the report. The table of reports 30 is a drop-down list from which the user may select different report formats (e.g., table format, page format, etc.).

Referring to FIG. 7, common project information is displayed in the project information area 31. This information appears on all pages associated with the Web application and is defined by the client. The page tabs 32 allow the user to navigate among the reports page, site locations page and tracking page of the Web application. Although three pages are shown in the figures, the present invention is not limited to any particular number of pages to the Web application. The number and content of pages may be dictated by client preferences.

The paging toolbar 33 (in this case, appearing twice on the same page) allow the user to move forward and backward in the list of records and also to select the number of records displayed per page. In a preferred embodiment, the total number of records and pages (based on whatever filtering criteria, if any, was selected by the user) is displayed on the right-hand side of the paging toolbar 33.

FIG. 8 is a screenshot of the site locations page of the Web application of the present invention. The site locations page is used by Web application users to view on a map a visual representation of where all the records were created. The screenshot shown in FIG. 8 provides on example of what a site locations page might look like, but the present invention is not limited to any particular configuration or content of the site locations page; the configuration and content of the site locations page is customized based on client business needs.

In the example shown in FIG. 8, the record locations are displayed as balloons or bubbles depending on the embedded mapping application used (for example, Google maps, Bing, or MapQuest). When clicked, each balloon will display the current information for that record, including the image and any other information that the client has requested be included. As with the reports page, results may be filtered using the filter bar 25; filtering will usually result in a smaller set of balloons being shown on the map. To create a report, the user activates the "create reports" button 29, which generates a report that includes every record (balloon) shown on the map and allows the user to download and save the report. The table of reports 30 is the same as on FIG. 7, as are the project information area 31 and page tabs 32.

The content area 34 of the site locations page is where the specific map and balloons representing the records (filtered or not) are displayed. In this example, each record is shown as a balloon 35. As noted above, clicking on the balloon will cause information associated with that record to be displayed in a pop-up window 36.

FIG. 9 is a screenshot of the tracking page of the Web application of the present invention. The tracking page is used by Web application users to track tablet computers that are in the field. The screenshot shown in FIG. 9 provides on example of what a tracking page might look like, but the present invention is not limited to any particular configuration or content of the tracking page; the configuration and content of the tracking page is customized based on client business needs.

When the tablet computer is turned on, and if Internet access is available, the GPS location (if available) will be sent automatically to the server. The program can also be configured to send the GPS location of the tablet device based on either time intervals or distance (for example, every five minutes or every mile).

The GPS data sent by the tablet computer to the server is available to be displayed on the tracking page of the Web application. The device list 37 provides a list of current tablet computers that are in the field or have been in the field in the last X number of days (this number being configurable by the client), together with an indication of the date and time on which each listed tablet computer last communicated with the server. In this area, the user may select a device, which will cause the last 30 tracks that have been accumulated for that tablet computer to be displayed in the tracks list 38. As used herein, the term "track" means the geographic path taken by a tablet computer for a given period of time.

The user may select a particular track by highlighting it in the tracks list 38 and activating the "show track" button 39. Selection of a track will cause that track 40 to be displayed on a map in the content area 41. If a current track (i.e., one for which the tablet computer is currently communicating with the server) is selected, the track is automatically updated so that the user may view the location of the tablet computer in real time. The last reported location of each tablet computer is displayed as a balloon or bubble 42 on the map. Clicking on a balloon will cause information associated with that tablet computer to be displayed in a pop-up window 43; this information may include, for example, last reported time and position, speed and heading). The project information area 31 and page tabs 32 are the same as on FIGS. 7 and 8.

Advantages of the present invention over prior art include: eliminating all paperwork; providing a custom-designed form on a field-ready table computer with built-in GPS and camera, as well as mobile broadband; enabling all reporting to be done in real-time whenever Internet access is available; delivering the reports to a Web-based reporting application server; incorporating notification rules and delivering the required notifications automatically and in real time; building the GPS location into each record; date and time stamping each record; providing custom-designed reports; and eliminating the need to synchronize data after it has been collected in the field.

All other known field inspection applications require the user to collect data on a device throughout the day and then bring that device back to the office, connect it to a desktop machine, and then synchronize the data to an application running on the desktop computer. The present invention eliminates this cumbersome and time-consuming step by generating the report, transmitting the report to the server, and electronically delivering the report to pre-selected individuals, all in real time.

* * *

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A system for conducting inspections and generating reports comprising:
   (a) a field device equipped with a built-in global positioning system, a built-in camera and built-in broadband wireless Internet access and on which is installed a client application that comprises an inspection form;
   (b) a server;
   (c) a Web services layer; and
   (d) a browser for accessing a Web application that supports interoperable machine-to-machine interaction over a network and enables the client application on the field device to call the server and the server to call the client application on the field device without the need for synchronization of data, thereby allowing transmission of data between the field device and the server to occur in real time;
   wherein a field worker enters data into the inspection form, the client application creates one or more records based on the data entered by the field worker, and the Web services layer transmits the record(s) to the server in real time if Internet access is available;
   wherein the Web services layer transmits records saved in an offline data store automatically when the client application polls for new data and has an Internet connection and wherein the server requests from the client application any records that have not been previously transmitted; and
   wherein the Web application enables a user to view records in real time and create reports based on the records transmitted to the server.

2. The system of claim 1, wherein each record has a global positioning system coordinate and is date- and time-stamped.

3. The system of claim 1, wherein notifications based on client rules are sent in real time when the records are transmitted to the server.

4. The system of claim 3, wherein the notifications include copies of the report(s).

5. The system of claim 1, wherein the inspection form enables the field worker to take photographs and/or create drawings, and wherein each record comprises a photograph or drawing.

6. The system of claim 5, wherein each record is saved with the global positioning system location of the photograph or drawing associated with that record.

7. The system of claim 5, wherein the system enables the user to add a caption to and/or annotate a photograph or drawing and to save the caption and/or annotation(s) with the record.

8. The system of claim 1, wherein the inspection form comprises an inspector field, a site description field, and a condition field.

9. The system of claim 1, wherein the inspection form comprises a notification number field.

10. The system of claim 1, wherein the inspection form comprises a comments box.

11. The system of claim 1, wherein the inspection form comprises a status bar that displays messages to the user.

12. The system of claim 1, wherein the inspection form comprises an image collection toolbar that allows the field worker to manage images associated with an inspection.

13. The system of claim 1, wherein the inspection form comprises an annotation toolbar that allows the field worker to draw on top of photographs and/or create drawings.

14. The system of claim 1, further comprising a pop-up image annotator that allows the field worker to draw on top of photographs and/or create drawings.

15. The system of claim 1, wherein the Web application comprises a content area and a filter bar that allows the user to determine which records are displayed in the content area.

16. The system of claim 1, wherein the Web application comprises a reports page, a site locations page, and a tracking page.

17. The system of claim 16, wherein the reports page allows a user to select records for inclusion in a report.

18. The system of claim 16, wherein the site locations page allows a user to view on a map a visual representation of where the records were created.

19. The system of claim 16, wherein the tracking page allows a user to track the location of one or more devices.

20. A method for conducting inspections and generating reports comprising:
   (a) providing a server and a field device equipped with a built-in global positioning system, a built-in camera and built-in broadband wireless Internet access and on which is installed a client application that comprises an inspection form;
   (b) providing a Web services layer; and
   (c) providing a browser for accessing a Web application that supports interoperable machine-to-machine interaction over a network and enables the client application on the field device to call a server and the server to call the client application on the field device without the need for synchronization of data, thereby allowing transmission of data between the field device and the server to occur in real time;
   wherein a field worker enters data into the inspection form, the client application creates one or more records based on the data entered by the field worker, and the Web services layer transmits the record(s) to the server in real time if Internet access is available;
   wherein the Web services layer transmits records saved in an offline data store automatically when the client application polls for new data and has an Internet connection and wherein the server requests from the client application any records that have not been previously transmitted; and wherein the Web application enables a user to view records in real time and create reports based on the records transmitted to the server.

21. The method of claim 20, wherein each record has a global positioning system coordinate and is date- and time-stamped.

22. The method of claim 20, wherein notifications based on client rules are sent in real time when the records are transmitted to the server.

23. The method of claim 22, wherein the notifications include copies of the report(s).

24. The method of claim 20, wherein the inspection form enables the field worker to take photographs and/or create drawings, and wherein each record comprises a photograph or drawing.

25. The method of claim 24, wherein each record is saved with the global positioning system location of the photograph or drawing associated with that record.

26. The method of claim 24, wherein the inspection form allows the user to add a caption to and/or annotate a photograph or drawing and to save the caption and/or annotation(s) with the record.

27. The method of claim 20, wherein the inspection form comprises an inspector field, a site description field, and a condition field.

28. The method of claim 20, wherein the inspection form comprises a notification number field.

29. The method of claim 20, wherein the inspection form comprises a comments box.

30. The method of claim 20, wherein the inspection form comprises a status bar that displays messages to the user.

31. The method of claim 20, wherein the inspection form comprises an image collection toolbar that allows the field worker to manage images associated with an inspection.

32. The method of claim 20, wherein the inspection form comprises an annotation toolbar that allows the field worker to draw on top of photographs and/or create drawings.

33. The method of claim 20, wherein the inspection form comprises a pop-up image annotator that allows the field worker to draw on top of photographs and/or create drawings.

34. The method of claim 20, wherein the Web application comprises a content area and a filter bar that allows the user to determine which records are displayed in the content area.

35. The method of claim 20, wherein the Web application comprises a reports page, a site locations page, and a tracking page.

36. The method of claim 35, wherein the reports page allows a user to select records for inclusion in a report.

37. The method of claim 35, wherein the site locations page allows a user to view on a map a visual representation of where the records were created.

38. The method of claim 35, wherein the tracking page allows a user to track the location of one or more devices.

* * * * *